UNITED STATES PATENT OFFICE.

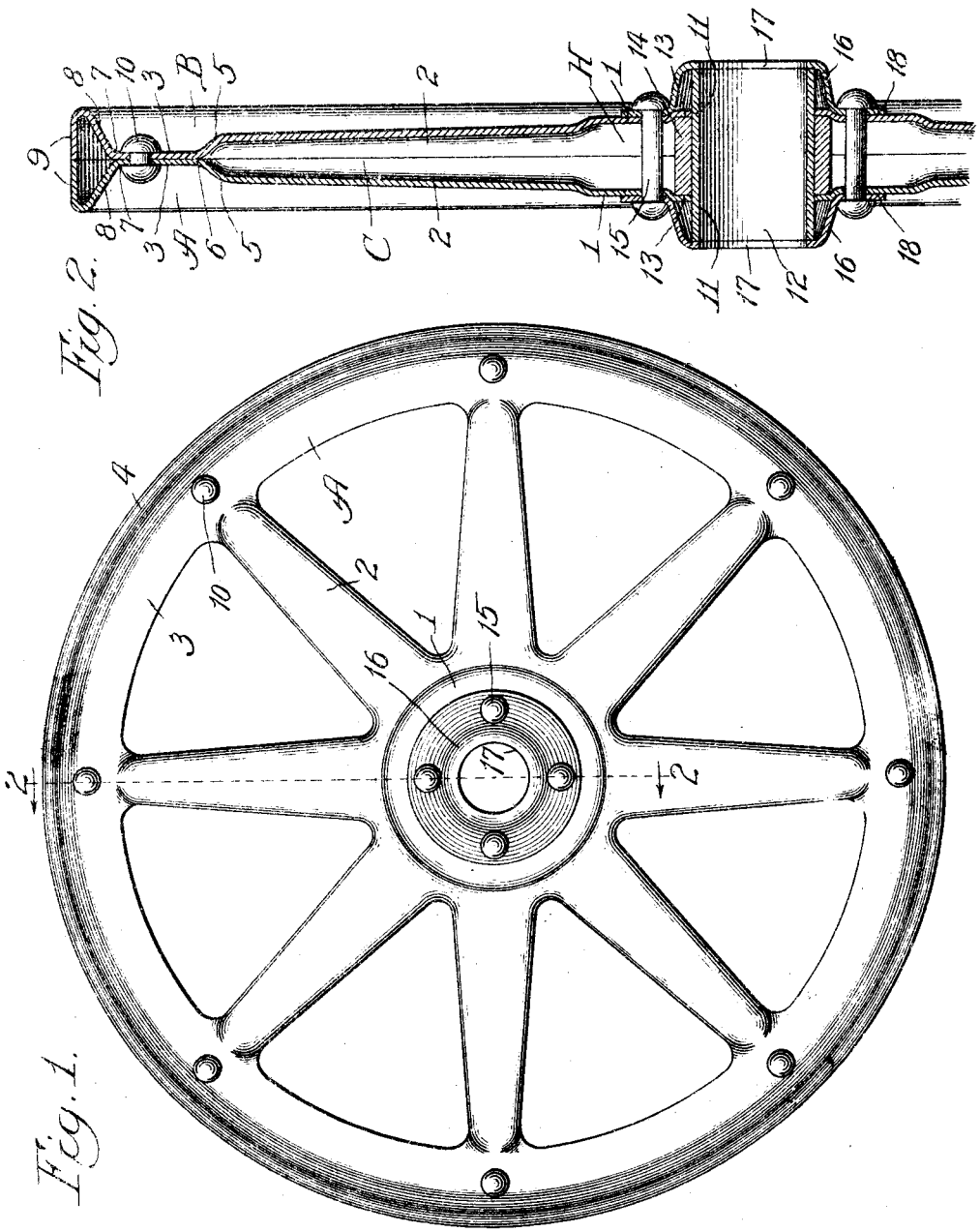

FELIX B. HORN AND ADAM WAGNER, OF CEDAR FALLS, IOWA, ASSIGNORS TO WAGNER MANUFACTURING COMPANY, OF CEDAR FALLS, IOWA, A CORPORATION.

SHEET-METAL WHEEL.

1,102,193.   Specification of Letters Patent.   Patented June 30, 1914.

Application filed June 15, 1911. Serial No. 633,242.

*To all whom it may concern:*

Be it known that we, FELIX B. HORN and ADAM WAGNER, citizens of the United States, residing at Cedar Falls, in the county of Blackhawk and State of Iowa, have invented a new and useful Improvement in Sheet-Metal Wheels, of which the following is a specification.

The object of our invention is to provide a sheet metal wheel which comprises but few parts, is light in weight and possesses great mechanical rigidity.

Referring to the accompanying drawings, Figure 1 is a side view in elevation of a wheel embodying our invention; and Fig. 2 is an enlarged cross-sectional view on line 2—2 of Fig. 1.

The wheel of our invention consists of two complementary halves or sections indicated as a whole by A and B which, when assembled, meet in a plane C perpendicular to the axis of the wheel. The sections are formed out of sheet metal and each comprises a hub portion 1, a plurality of concave spoke members 2 extending radially from the hub portion and having straight edges which lie substantially in the meeting plane C, a flat annular portion 3 in which the outer ends of the spoke members terminate, and a tread portion 4. The spoke members of the two wheel sections converge gradually toward the outer ends to a point 5 from which they converge suddenly to a meeting point 6 lying in the common meeting plane C. Of course, it is to be understood that when we refer to the edges of the spoke members as lying in the common meeting place C, we do not mean that in the actual construction of the wheel the parts must fit together as perfectly as shown in the drawing. Such a mathematically perfect fit would not usually be obtained in practice, nor is it necessary in the practical embodiment of the invention. It is sufficient that the two halves of the wheel come together as closely as the working of the sheet metal permits. From the point 7 at the outer end of the flat annular portion 3, the metal diverges outwardly at 8 and is then turned inwardly at 9 parallel to the axis of the wheel to form a flat tread rim. Suitable fastening devices such as rivets 10 pass through the annular portion 3 for rigidly holding the wheel sections together.

The annular portions 3 are of considerable width and when brought together form a connection of double thickness between the spokes and the tread rim. It will be observed that the walls of the hub portions 1 are substantially parallel and form a hub chamber H. The hub portions are provided with openings 11 through which extends a bushing 12. The hub portions are each provided with an annular recess 13 around the hub opening. In the hub chamber H is arranged a spacing collar 14 which fits snugly around the bushing 12. The ends of the collar 14 rest in the recesses 13 of the hub portions. Suitable fastening devices such as rivets 15 pass through the hub portions without engaging the collar 14 for rigidly clamping the hub portions against the collar. The fastening devices 15 also hold in place the sheet metal caps 16 which engage the outer ends of the bushing 12 to prevent the same from pushing or working sidewise. The caps 16 are each provided with an opening 17 which is in alinement with the bushing 12. The caps 16 are provided with outer flanges 18 which lie flat against the walls of the hub portions when the wheel is assembled. The above hub construction prevents the wheel sections from spreading or getting out of position at the center, and thus enables the wheel to support a heavy load.

Having thus described our invention, what we claim as new and desire to secure by Letters Patent of the United States is:

1. A sheet metal wheel consisting of two sections which comprise each a hub portion, spoke members and a tread portion, the walls of the hub portions being substantially parallel, forming an annular hub chamber, the extremities of the parallel walls of the hub portions each having formed therein an annular recess, an annular spacing collar adapted to rest within said recess, a cylindrical bushing mounted within said spacing collar and extending equi-distant on each side thereof, retaining caps resting against the outer extremity of said bushing and means for securing said retaining caps to the hub portions above said annular collar, substantially as and for the purpose specified.

2. A sheet metal wheel consisting of two complementary sections which comprise each a hub portion, spoke members and a tread portion, the walls of the hub portion being substantially parallel to each other and having alining shaft openings, the said parallel walls of the hub portions each having formed therein an annular recess, a cylindrical spacing collar adapted to rest within said recess and adapted to lie flush with the shaft openings formed in the hub portions, a cylindrical bushing adapted to rest within said spacing collar and extending equi-distant on each side thereof, retaining caps having each an opening formed therein adapted to lie in alinement with the opening formed in the bushing, each of said caps having a peripheral flange, and means extending through said flanges and the parallel walls of the hub members for connecting the hub portions and the caps together whereby the said bushing will be prevented from lateral movement.

In witness whereof, we hereunto subscribe our names this 2nd day of June, 1911.

FELIX B. HORN.
ADAM WAGNER.

Witnesses:
W. L. March,
W. R. Irwin.